United States Patent [19]

Lantai

[11] 4,115,950

[45] Sep. 26, 1978

[54] METHOD OF INCREASING THE YIELD IN THE CULTIVATION OF TUBER-PRODUCING PLANTS AND A DEVICE FOR CARRYING OUT THE METHOD

[76] Inventor: Kálmán Lantai, Götatan 4$^{II}$, 752 22 Uppsala, Sweden

[21] Appl. No.: 662,936

[22] Filed: Mar. 1, 1976

[30] Foreign Application Priority Data

Mar. 6, 1975 [SE] Sweden .............................. 7502498

[51] Int. Cl.$^2$ ............................................. A01G 1/00
[52] U.S. Cl. .......................................... 47/58; 47/83; 47/1.1; 111/1; 111/DIG. 1
[58] Field of Search ...................... 47/1, 3, 5.5, 24–27, 47/30, 58, 34.12, 33, 1.1, 83; 111/1, DIG. 1

[56] References Cited

U.S. PATENT DOCUMENTS

3,389,499   6/1968   Haile .......................................... 47/33

FOREIGN PATENT DOCUMENTS

2,302,024   9/1976   France .......................................... 47/83

*Primary Examiner*—Robert E. Bagwill
*Attorney, Agent, or Firm*—Witherspoon, Lane & Hargest

[57] ABSTRACT

A method and apparatus for increasing the production of tuber-producing plants per unit area is disclosed. In accordance with this invention, a seed-tuber is planted in soil that is contained in a first box or frame unit. As the plant grows it develops new leaves and axil-buds. When the plant reaches a given height, which is different for different plants, a new layer of soil is added to the first box or frame unit. The new layer of soil does not completely cover the plant. Instead, a layer of soil is added such that the apical meristem is located at the soil surface or about one cm. below the soil surface. As the plant continues to grow another new layer of soil is again added in the manner described. When the level of the soil approaches the top of the first box or frame unit, a second box or frame unit designed to fit on top of the first box or frame unit is placed on top of the first box or frame unit. This second box or frame unit is open at the top and bottom, whereas the first box or frame unit may have a bottom plate. New layers of soil are then added in the second box or frame unit in the manner and at the times described above with reference to the first box or frame unit. This process is repeated with additional boxes or frame units being piled one on top of the other and new layers of soil added. After the last layer of soil has been added the plant is allowed to grow until it is ready for harvesting. Various different embodiments of the box or frame units of this invention are disclosed.

6 Claims, 20 Drawing Figures

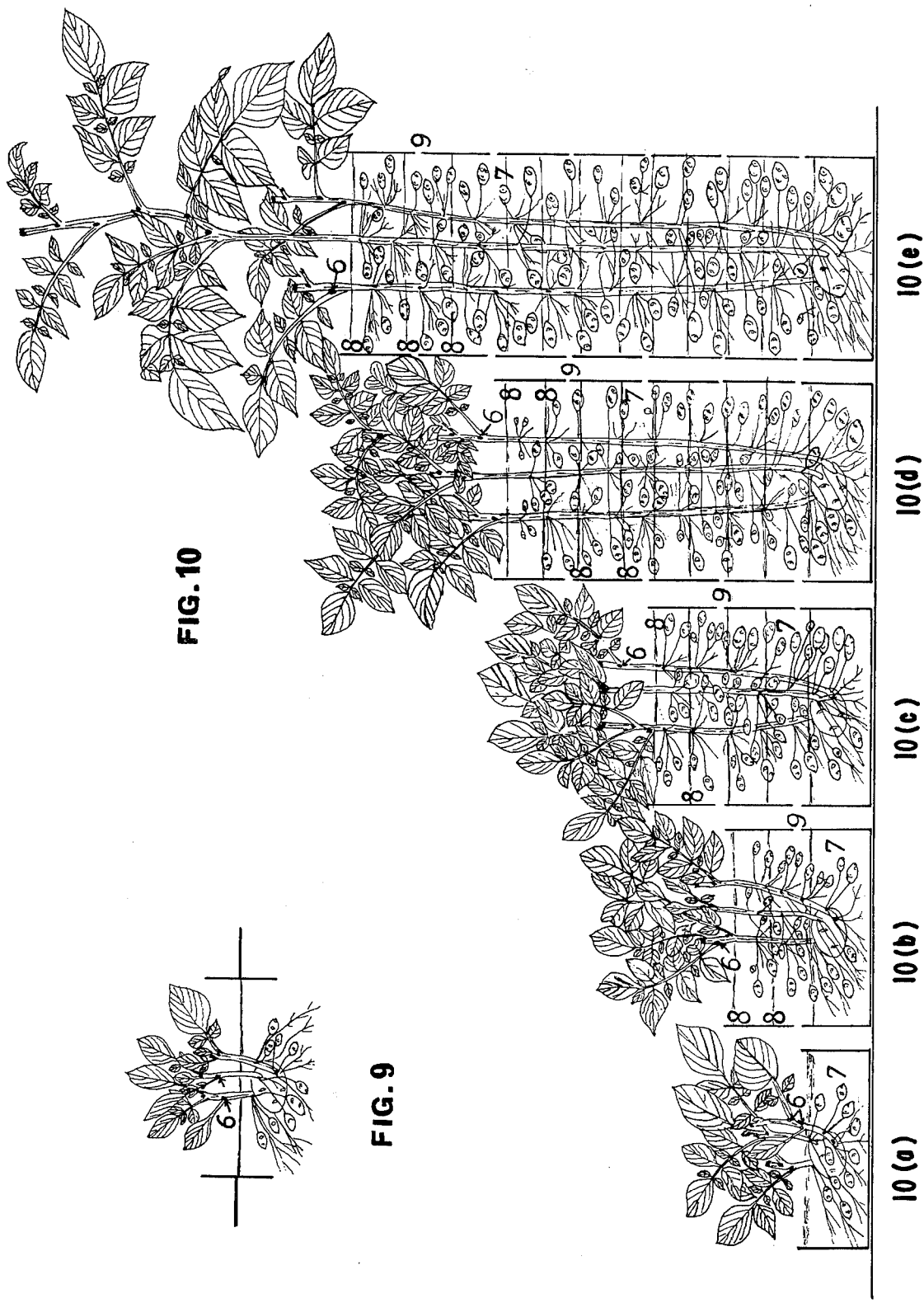

METHOD OF INCREASING THE YIELD IN THE CULTIVATION OF TUBER-PRODUCING PLANTS AND A DEVICE FOR CARRYING OUT THE METHOD

BACKGROUND OF THE INVENTION

The present invention relates to a new cultivation-technological method for the cultivation of tuber-producing plants such as potatoes (*Solanum tuberosum* L.), jerusalem artichokes (*Helianthus tuberosus* L.), and the like, having dormant (embryonal) buds in the axils. The method according to the invention, which makes it possible to multiply the production of tubers per unit area, can be applied in the farming as field cultivations, in greenhouse cultivations, etc. The invention also comprises a new device for use in said method.

As is well known tuber-producing plants, especially potatoes, has been cultivated in essentially the same manner for a long time (cp. for example Nordisk Familjebok (1915), Vol. 22, col. 57–58 and B. Svensson "Potatis" 1961, SPOR, p. 37–47). According to this well known method of cultivation seed tubers are set out in rows in a field and then covered with soil. When the plants have emerged a certain distance above the soil surface, the potatoes are usually moulded up, i.e. part of the soil between the rows of potatoes is brought towards the stems of the plants to form a layer of soil sloping downwards from the stems. The moulding up is carried out 1–3 times during the development of the potatoes, the main purpose being to protect the potato tubers from light and thereby prevent green-colouring thereof. As is well known in the art this cultivation method requires a certain minimum distance between the rows of plants and also between the individual plants in each row, which means that the method is area consuming. According to information available from the Central Bureau of Statistics, the average number of potato plants in Sweden is about 4,3 plants per $m^2$, the number of stems amounting to about 20 per $m^2$. The number of tubers having a diameter of at least 1 cm amounts to about 60 per $m^2$. [cp. also G. Rösöi (1975), "Development and structure of spring-sowed crops".] It has been possible to increase the yield per unit area in this cultivation method by means of improved fertilizing methods and the development of new plant varieties, but the increase of the yield has been relatively limited.

SUMMARY OF THE INVENTION

The present invention relates to a completely new method for the cultivation of tuber-producing plants having dormant (embryonal) buds in the axils. The new cultivation method makes it possible to multiply, e.g. nine-fold, the production per unit area and thus to release about 90% of the area, which is now used for the cultivation of potatoes and similar crops, for the cultivation of other crops and/or for an increased cultivation of said crops. Because of the higher yield per unit area the method is also extremely suitable for industrial production in green-houses, and in this case the total yield can be increased still further by cultivation all the year round, resulting in at least two harvests per year. As the new cultivation technique does not require large cultivation areas, industrial cultivations can be located near large cities—where the demand is highest—or in places where suitable energy sources are available, e.g. waste-heat from nuclear plants, geysers, etc. The method according to the invention can also advantageously be used in the development of improved varieties of e.g. potatoes, as the multiplication of the selected variety can be accelerated. The value of the above indicated advantages of the new cultivation method according to the invention is obvious.

The new cultivation method according to the invention is based on the discovery that dormant (embryonal) buds in the axils of the emerged stems of tuber-producing culture-plants can be forced to produce stolones and tubers if they are covered with substantially horizontal new layers of soil as they are formed. This property is according to the invention utilized in such a manner, that the cultivation is carried in box or frame units, which are repeatedly filled with new layers of soil to form a progressively higher pile of soils. It should in this context be noted, that the expression "frame" designates a box, which has no bottom but only side walls.

It is preferred to use box or frame units, which can be piled on top of each other as new layers of soil are applied. In this case, it is obvious that only the lower pile unit is allowed to be a true box, i.e. have a bottom. On the other hand, it is not necessary that the lower pile unit has a bottom, but a lower frame unit can be placed directly onto (or into) the soil, especially in connection with field cultivation. When carrying out the method according to the invention, there is consequently formed a pile of soil, which grows higher and higher the more layers of soil that are added, the cross-sectional form of the soil pile corresponding to the form of the surrounding box/frame units. The dormant axil buds, that are covered with soil, give rise to stolones and tubers.

The cultivation is started in the usual manner by planting a seed-tuber, which is preferably pre-grown, a stalk or a seed in the soil of a first box or frame unit. When using a box as the first (lower) cultivation unit, an initial soil layer of suitable depth, e.g. 5–8 cms, is applied on the bottom of the box. The first box or frame unit is disposed on free land, in a hot-bed, in a greenhouse, or the like. Sandy soil is preferably used for the initial planting as well as for the subsequent coverings of soil. Suitable amounts of water and fertilizers are added during the entire cultivation period. The growing stems are permanently developing new leafs and axil-buds, which are periodically covered with new layers of soil without being cut away. When cultivating potatoes, it is preferred to apply a new soil layer when the stems have reached a height of about 5–8 cms above the soil surface, whereas a longer distance, e.g. up to about 18 cms above the soil, is preferred when cultivating artichokes. When the soil level approaches the upper edge of the upper frame unit, another frame unit is piled on top of said frame unit, etc.

When applying new layers of soil, the entire plant should preferably not be covered, as this would harm the assimilation process, which supports the tuber-production. Thus, the apical meristem is preferably located at the soil surface or is covered by a soil layer of about one cm. The application of layers of soil is continued until the desired pile height has been reached, which—for potatoes—can mean a pile height of for example 75–100 cms and the tubers produced are then harvested when they have reached the desired size. (Of course, the rate of development of the plants varies depending on such factors as temperature, light conditions, etc.) The harvesting time is also decided by the desired quality of the tubers. Thus, the tubers are harvested when they are small to medium-size when, for example, protein-rich potatoes are desired, whereas bigger, starch-rich potatoes are harvested at a later stage. The taste quality can also be improved if the access of water is restricted at the end of the cultivation period, so that the soil becomes drier. It is not either necessary to harvest the entire pile at the same time, but the tubers of the lower box/frame units can, if desired, be harvested first (for potatoes e.g. after about 3½ to 4 months), the cultivation in the upper units then being continued as before. In this manner it is possible to obtain several harvests from one and the same seed tuber (or stalk or seed).

Although it is possible to get good results with the new cultivation method according to the invention by planting two or more seed tubers (stalks or seeds) in each pile unit, it is preferred to plant only one seed tuber (stalk or seed) in each unit. It may, as an example, be mentioned that the use of square frame units having a size of about ⅓ m × ⅓ m (say 30–40 cms × 30–40 cms), which is a suitable size for cultivating one seed potato (stalk or seed), makes it possible to cultivate nine seed potatoes per m$^2$, i.e. more than a doubling of the tuber density compared to the present cultivation technique. Another advantage with planting one or only few seed tubers in each frame unit is that the cultivation damages can be reduced to a minimum, as the plants in each pile of frame units can be controlled efficiently and plants infested with fungi or viruses can be selected out during the cultivation period (the infested pile is taken away), thereby preventing propagation of the attack. The soil of the infested pile can then be disinfected (e.g. by heat treatment) and re-used.

The invention also comprises a frame system for carrying out the cultivation method according to the invention, said frame system being characterized that it comprises a number of frame units, adapted to be piled on top of each other to form a box-like pile, each frame unit comprising at least two rectangular, square or cylindrical wall elements which are interconnected and preferably made of a plastic material, e.g. polytetrafluoro ethylene, at least one wall element in each unit having at least one downwardly protruding leg portion and at least one corresponding recess extending downwardly from the upper edge of the wall element and adapted to receive a leg portion from an adjacent frame unit, the length of said leg portions being longer than the depth of said recesses so as to form an air gap between adjacent frame units, which are piled on top of each other.

A complete and full understanding of the invention can be obtained from the following detailed description when read in conjunction with the annexed drawing in which.

FIG. 9 diagramatically illustrates the initial steps of the method of this invention utilizing a bottomless first box or frame unit of this invention; and FIGS. 10a through 10e diagramatically illustrate the method of this invention as carried out with the first box or frame unit of this invention having a bottom plate.

DETAILED DESCRIPTION OF THE INVENTION

Figure 1:
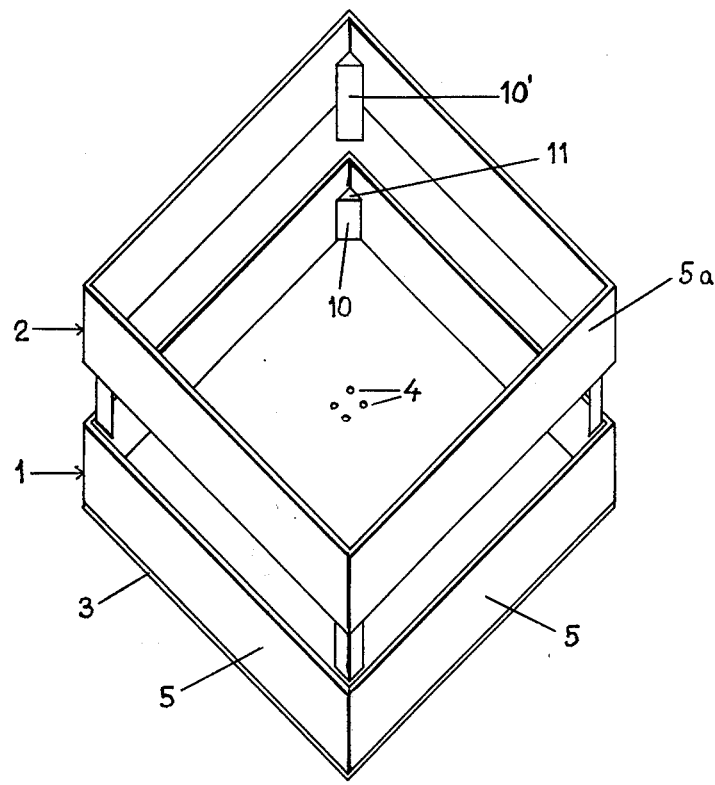
FIG. 1 is a perspective view of a first embodiment of the box or frame units of this invention.

In FIG. 1 there is shown a box unit 1, intended to be used as the bottom unit of a cultivation pile according to the invention, and a frame unit 2, adapted to be piled on top of the box unit 1 or on top of another frame unit 2. The box unit 1 has a substantially square bottom plate 3, which is preferably perforated as illustrated at 4. Four rectangular side walls 5 are firmly secured to the bottom plate 3 and to adjacent side walls 5. In each corner of the box unit 1 there is provided a triangular leg 10, which is fixed to the adjacent side walls 5 and to the bottom plate 3. Each leg 10 has an upper abutment surface 11. The frame unit 2 is identical with the box unit 1 with the exceptions that it has no bottom plate 3 and that the corner legs 10' extend below the bottom edges of the side walls 5a. In each box and frame unit the distance from the upper edges of the side walls 5 to the abutment surface 11 of the leg 10 or 10' is about 2-5 mm less than the length of the projecting part of the frame leg 10'. In this manner an air gap of about 2-5 mm will be formed between the upper resp. lower edges of adjacent side walls 5 in a pile formed by a box unit 1 and/or frame units 2. Said edges are preferably even and essentially perpendicular to the main surfaces of the side walls 5 so as to form an air gap causing only little evaporation of the water contained in the soil, while at the same time ensuring sufficient supply of air to the soil.

Figure 2:
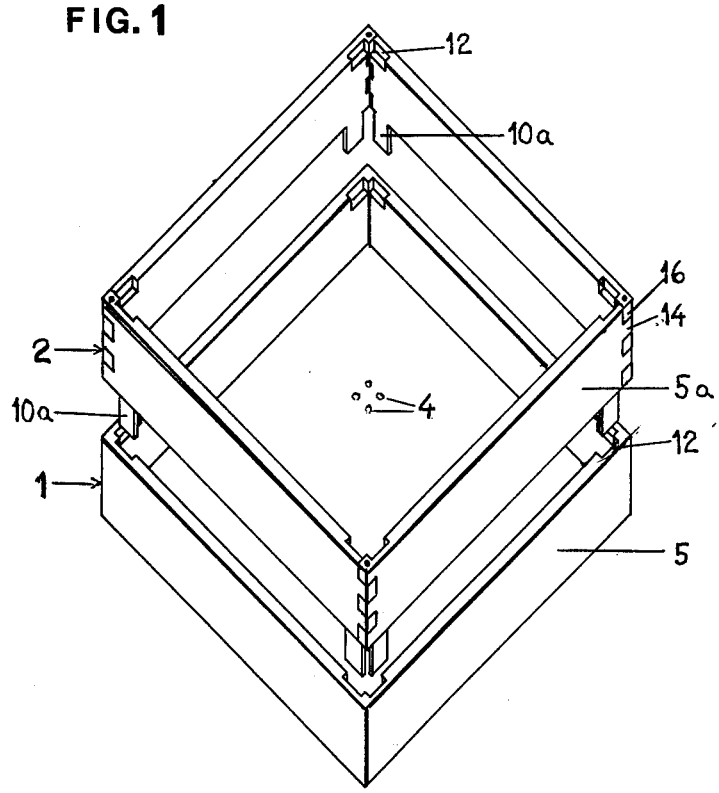
FIG. 2 is a perspective view of a second embodiment of the box or frame units of this invention.

In FIG. 2 there is shown an alternative embodiment of the box and frame units shown in FIG. 1. This embodiment differs from the one shown in FIG. 1 in that the side walls 5a of each frame unit 2 are not rigidly secured to each other, but are interconnected by means of hinge joints. Another difference compared to FIG. 1 is that the legs of each frame unit has a different design. Thus, each side wall 5a has two legs 10a extending from the bottom edge, and each side wall 5a resp. 5 has two corresponding recesses 12 provided in the upper edge. The length of the legs 10a is about 2 to 5 mm greater than the depth of the recesses 12, whereby a corresponding air gap is formed between adjacent box/frame units in the pile.

Figure 3:
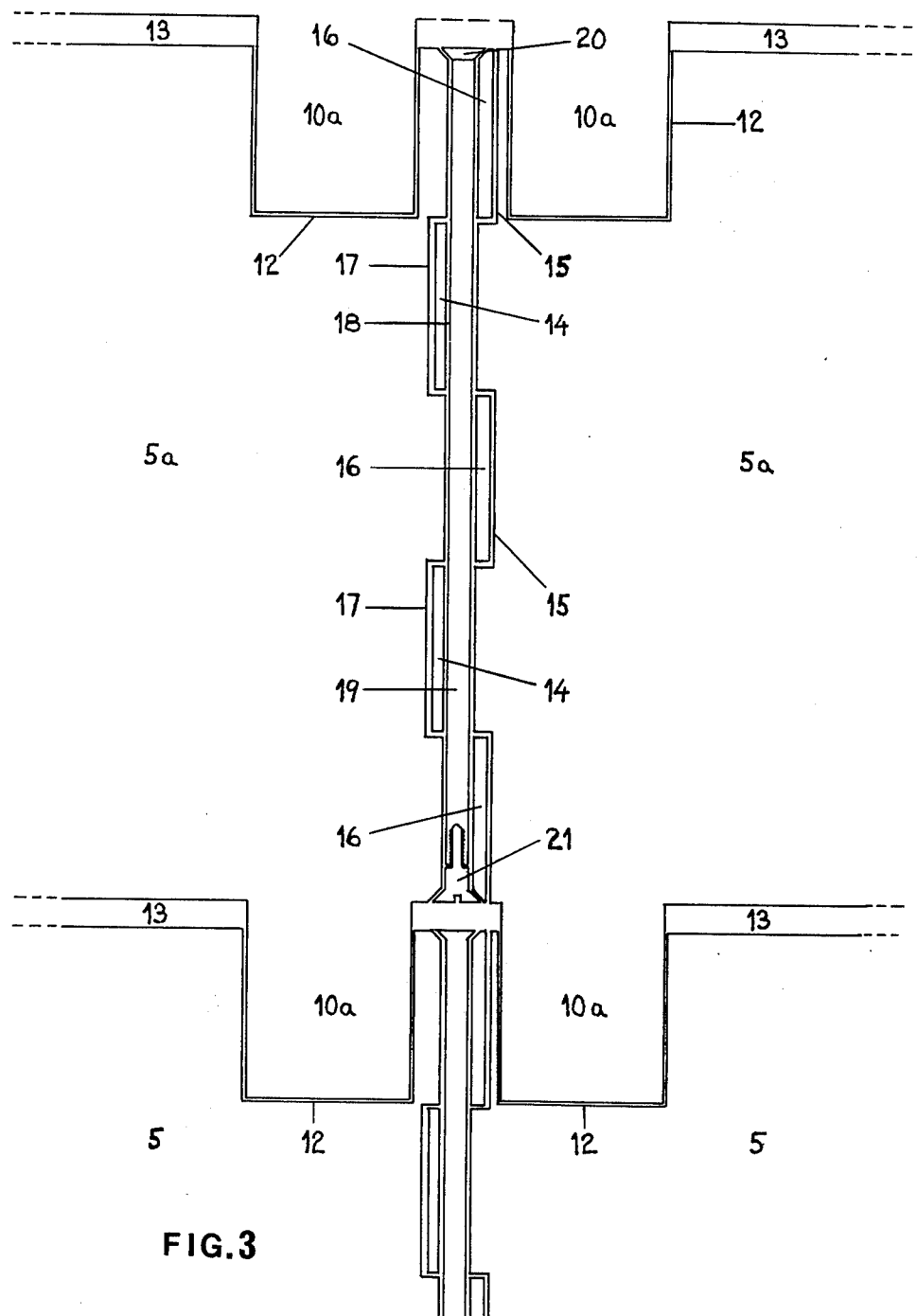
FIGS. 3, 4 and 5 illustrate hinge type connections that may be used between adjacent wall elements of the same box or frame unit.
Figure 4:
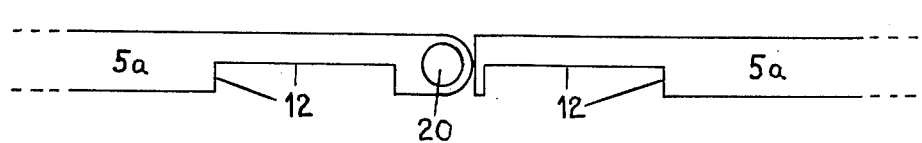
Figure 5:
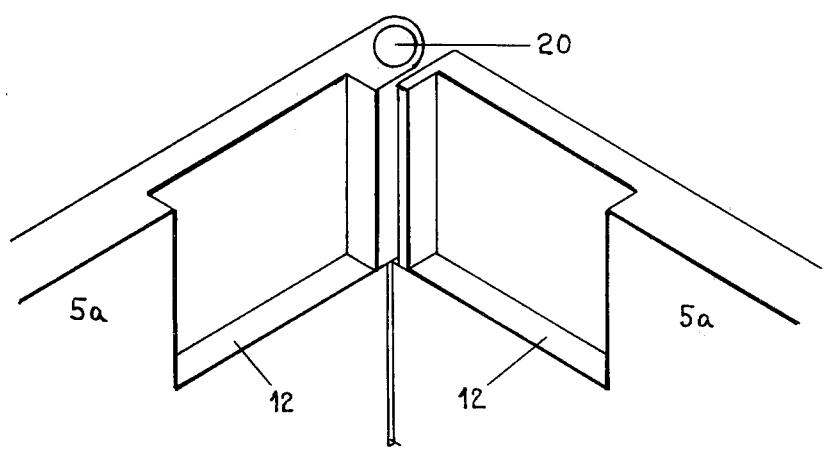

The specific design of the hinge joints and of the cooperation between legs 10a and recesses 12 appears from FIGS. 3, 4 and 5, which show parts of a frame unit 2 in a storage position with two adjacent side walls 5a disposed in one and the same plane, the air gap between the side walls of two adjacent frame units being indicated at 13. The hinge joint between the two side walls 5a is formed in that the side edge of a side wall 5a is provided with two projecting portions 14 and intermediate recessed portions 15, whereas the other side wall 5a has three corresponding projecting portions 16 and intermediate recessed portions 17, said projections and recesses being in engagement and alignment with each other. A central bore 18 extends through all of the projections and recesses and accomodates a pin 19 having a head 20, which is larger than the diameter of the bore 18. A locking means in the form of a screw 21 locks the pin 19 in the bore 18. In each frame unit at least one hinge joint is preferably not locked permanently, and in this case the locking means 21 is left out. By removing the pin 19 the frame units can then easily be unfolded to a plan unit suitable for storing.

Figure 8:
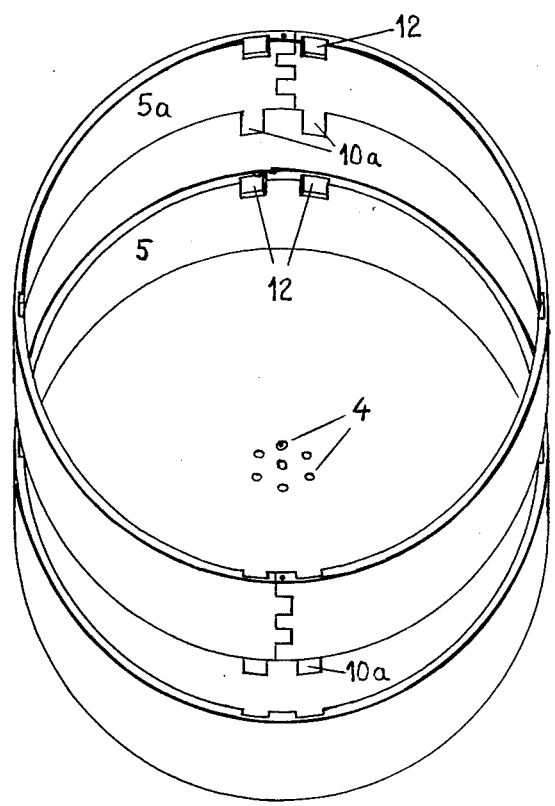
FIG. 8 is a perspective view of a fifth embodiment of the box or frame units of this invention.
Figure 6:
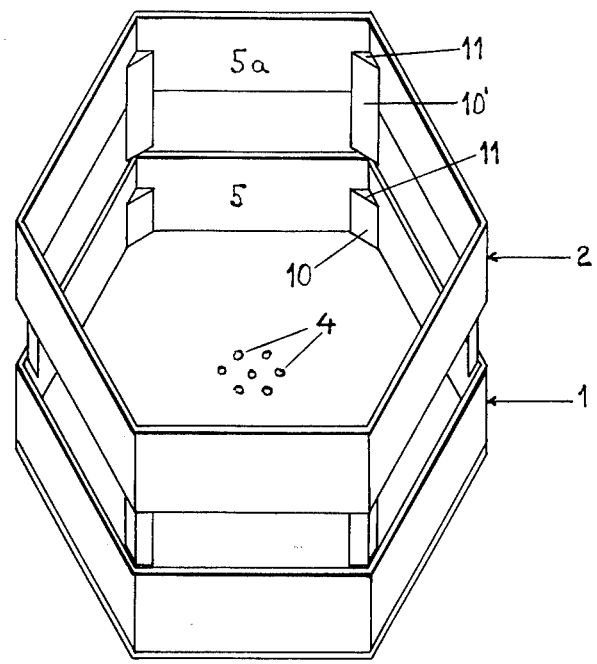
FIG. 6 is a perspective view of a third embodiment of the box or frame units of this invention.
Figure 7:
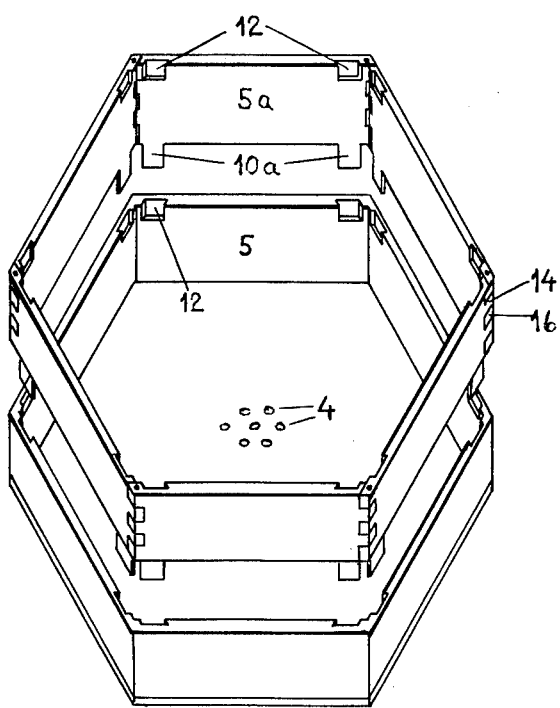
FIG. 7 is a perspective view of a fourth embodiment of the box or frame units of this invention.

Some alternative embodiments of the box and frame units according to the invention are illustrated in FIGS. 6-8. These embodiments differ from those described above only in that the cross-sectional form of said units are different.

FIGS. 9 and 10a through 10e diagramatically illustrate the cultivation of potatoes in accordance with the method of this invention as carried out by the utilization of the box or frame units of this invention.

Considering first FIGS. 10a through 10e, these figures illustrate in detail the method of this invention. In FIGS. 10a through 10e, the dormant axil buds are designated by the numeral 6, the formed stolones/tubers by the reference numeral 7, the different periodically added soil layers by the numeral 8 and the air gap between the box or frame units by the numeral 9.

In FIG. 10a a potato plant is shown growing in the first box or frame unit 1. Frame unit 1 in FIG. 10a has a bottom plate. Only one layer of soil is shown in frame unit 1. In practice, the seed potato is planted in frame unit 1 on approximately 5 to 8 cm. of soil and then is covered with soil. Frame unit 1 preferably has a depth greater than 5 to 8 cm. When the plant has grown to a given height, about 5 to 8 cm. for potatoes, a new layer of soil is added to frame unit 1. The depth of this new layer of soil is such that the apical meristem is at or 1 cm. below the surface of the new layer of soil. That is, the entire plant is not covered by the new layer of soil. Fertilizer and water are preferably added when the new layer of soil is added.

When the surface of the soil reaches the top of frame unit 1, a frame unit 2 is placed on top of frame unit 1 and new layers of soil 8 are added to the combination of frame unit 1 and frame unit 2 as the plant grows, as is illustrated in FIG. 10b. As the soil reaches the top of the first frame unit 2, additional frame units 2 are added one on top of the other and new layers of soil are added as the plant grows until the desired pile height is reached. The plant is then allowed to grow until the tubers have reached the desired size and are ready for harvesting. This process is illustrated in FIGS. 10c through 10e. In FIG. 10e, a total of seven frame units, one frame unit 1 and six frame units 2 are shown stacked one on top of the other.

FIG. 9 is given to illustrate the method of using a frame unit 1 that does not have a bottom plate. In FIG. 9, the seed-potato is planted in the soil 30 which may be in a field or in a greenhouse. The frame unit is shown as being practically embedded in soil 30. Frame unit 1 may be partially embedded in the soil as shown or may merely be placed on the top of soil 30. New layers of soil are added to frame unit 1 as described with reference to FIG. 10a and frame units 2 are then added as described with reference to FIGS. 10b through 10e. Thus, FIG. 9 merely illustrates the bottomless frame unit 1 of this invention and in FIGS. 10a through 10e, this bottomless frame unit 1 of FIG. 9 can be substituted for the frame unit 1 in FIGS. 10a through 10e which is a frame unit 1 having a bottom plate since the process is the same no matter which species of frame unit 1 is used as the first frame unit.

I claim:

1. A method for increasing the yield in the cultivation of tuber-producing plants comprising the steps of:
    (a) planting a seed-tuber in a first box-like frame unit;
    (b) adding a new layer of soil in said first frame unit to cover the embryonal axil buds formed as the plant grows from the seed-tuber;
    (c) placing a second box-like frame unit on top of said first box-like frame unit when the soil added to said first box-like frame unit reaches the top of said first box-like frame unit;
    (d) adding layers of soil in said second box-like frame unit to cover the embryonal axil buds formed as the plant grows; and
    (e) adding additional box-like frame units one on top of the other as the plant grows, each time covering the embryonal axil buds with new layers of soil in said frame units as said plant grows until the pile of soil formed reaches a given height.

2. The method as defined in claim 1 wherein said given height is between 75 and 100 cms.

3. The method as defined in claim 2 wherein said box-like frame units are added one on top of the other in such a manner that an air gap exists between each one of said box-like frame units.

4. The method as defined in claim 3 including the harvesting of the tubers formed by said tuber-producing plant when the tubers have reached the desired size.

5. The method as defined in claim 4 wherein said tubers are harvested one frame unit at a time starting with said first frame unit.

6. The method as defined in claim 5 wherein a plurality of seed-tubers are planted each one of said plurality of seed-tubers being planted in a different one of said first box-like frame units with additional box-like frame units being added one on top of the other to each one of said different one of said first box-like frame units.

* * * * *